Patented June 13, 1950

2,511,119

UNITED STATES PATENT OFFICE 2,511,119

AQUEOUS NUT EMULSION

Jack H. Mitchell, Jr., Birmingham, Ala., assignor to Stevens Industries, Inc., Dawson, Ga., a corporation of Georgia No Drawing. Application September 20, 1947, Serial No. 775,371

6 Claims. (Cl. 99—128)

My invention relates to a novel, stable emulsion of a free-flowing nut product. More particularly, it concerns a stable, aqueous emulsion of extremely finely ground peanuts.

My new emulsions are eminently suited as bases for various nut food products. In a preferred embodiment of my invention these emulsions are sweetened, flavored and then frozen to produce a very delicious food having high nutrient value and a texture similar to ice cream.

In a copending application by Wilbur A. Lazier and Joseph F. Vincent, filed on the same day herewith, there is described a free-flowing nut product obtained by grinding shell nuts, preferably in a colloid mill, to such a fine state of subdivision that the particle size of the solids contained therein is reduced to microscopic proportions. The intensive grinding to which the nuts are subjected results in the release of a far greater proportion of the nut oil than in the ground nut products heretofore known, so that a product of syrup-like consistency is formed composed of minute, solid particles suspended in nut oil. Generally these particles are of such size that at least 85% by weight thereof will pass through a standard 325-mesh sieve, while at least 90% will also pass through a standard 200-mesh sieve. Preferably at least 90% will pass through the 325-mesh sieve, while less than 5% are retained by the 200-mesh sieve. For certain applications I select a particle size such that 97% will pass through the 325-mesh screen and only 0.5% is retained by the 200-mesh sieve.

The principal object of my invention is to convert practically the whole shelled nut into a highly nutritious, readily digestible food product having physical characteristics ranging from those of milk to those of a thick custard. Another object is to provide a food base that may be conveniently employed to prepare a variety of delicious foods and drinks. A further object is to form a stable, aqueous emulsion of the free-flowing nut product described in the copending patent application referred to above. Additional objects will become apparent as the description of my invention proceeds.

I have found that the foregoing objects may be accomplished by taking the free-flowing nut product referred to above, adding water thereto, and then intensively agitating the mixture until an aqueous emulsion is formed. The consistency of the resultant emulsion may be controlled by regulating the proportion of water added to the free-flowing nut product. In practice I have found that best results are obtained when adding from one part to ten parts by weight of water to each part of the extremely finely ground nut product.

It is generally desirable to take steps to increase the stability of the aqueous emulsions so formed. For this purpose I have found various expedients that may be employed singly or in combination. Almost any desired degree of stability may be achieved, so that a nut emulsion suitable for each of the various purposes herein described is assured.

Particularly in the case of nut emulsions having a consistency similar to milk or cream, and even with such of greater consistency, it is best to pass them through a homogenizer to insure complete emulsification of the oil and water phases. The stability of the resultant products is greatly improved by heating the emulsions at a temperature of approximately 150° to 190° F. for about 5 to about 20 minutes, preferably before homogenization.

Settling of the minute, solid particles suspended in my novel nut emulsions may be substantially inhibited by the addition of a suitable alkalinizing agent, such as disodium phosphate, sodium bicarbonate or the like. The pH of the nut emulsions without any additions usually lies between about 6.0 and about 6.2. I generally add sufficient alkalinizing agent to raise the pH value to between about 6.5 and about 7, preferably between 6.6 and 6.8. It appears that by thus raising the pH value, the protein solubility in the aqueous phase is increased, which in turn accounts for the increased stability of the nut emulsion. When the product is used in the preparation of a frozen food, its whipping ability is increased and the resultant confection has a less starchy consistency. A further advantage is that the flavor becomes more neutral, thus rendering the product more suitable for use with a number of different flavors. The preferred alkalinizing agent is disodium phosphate and, in the case of a peanut emulsion, the addition of from about 1.0% to about 1.2% by weight of the peanuts used of this alkalinizing agent is sufficient to achieve the results indicated above.

To insure the high degree of stability required for shipment and storage of the emulsions one may incorporate therein small but effective amounts of edible emulsifying agents, such as alginates, gelatin, vegetable gums and the like. These are preferably added in amounts of a few tenths of one per cent by weight of the emulsion. In this manner ample stability is imparted to make my new nut emulsions suitable for commercial distribution and sale.

The effectiveness of the foregoing expedients may be illustrated as follows:

An emulsion is prepared by adding five parts by weight of water to one part by weight of an extremely finely ground, free-flowing peanut product and then intensively agitating the mixture. This emulsion exhibits some settling of solid particles within 30 minutes and a slight separation of oil within 24 hours. The separation of the solid particles may easily be corrected by slight stirring, so that the emulsion is suitable as such for many purposes. To this emulsion there is added about 0.25% of an edible emulsifying agent, such as sodium alginate, and about 1.0% of disodium phosphate (alkalinizing agent), based on the weight of the peanuts used. The mixture is heated in a steam-jacketed vessel at between 160° and 180° F. for from 10 to 15 minutes, and is then passed through a homogenizer while still hot. The product so formed shows no appreciable settling of solid particles after six or seven days and no oil separation after several weeks. Homogenization of the mixture before heating has not nearly so much effect as homogenization after heating. The addition of the emulsifying agent results in about doubling the stability of the product.

My new products may be converted, as desired, into a great variety of delicious foods and drinks by the addition of other edible substances, particularly sweetening and flavoring materials. They thus represent a very convenient and highly nutritious food base. Owing to the minute size of the solid particles contained therein, they are much more readily digestible than other nut products. Any desired nutritive balance may be achieved by supplementing them with added vitamins, amino acids, minerals and the like. They may be employed as a substitute for milk or cream in many applications.

My new products are distinguished from prior attempts to produce a vegetable milk in that they utilize almost the entire shelled nut and its nutrient values. Heretofore attempts have been made to produce a vegetable milk using only the water-soluble filtrate obtained from normally ground peanuts or soybeans. This filtrate contains emulsified oil- and water-soluble proteins, carbohydrates and minerals. However, much of the bulk of the peanut or soybean is wasted, unless some other use is found for the residue.

Peanuts are preferred as the basis for my new products, although other nuts, such as cashew nuts and pecans, or soybeans may also be used. The shelled peanuts are preferably browned lightly by the usual roasting procedure, and then treated in the customary manner to remove hearts and skins which are discarded. Frequently it is desirable not to brown the nuts, but merely to dry them thoroughly at about 260° F. until they lose their characteristic raw flavor. In any event, I avoid a dark roast, because emulsions produced from such nuts do not have the bland taste and odor of those produced from lightly roasted nuts.

The so prepared nuts are thereafter ground to the desired, minute particle size, whereupon a product of syrup-like consistency is produced. This product and its method of production forms the subject-matter of the copending application referred to previously. When it is desired to produce certain food products directly, the sweetening and flavoring materials may be added along with the water prior to emulsification of the mixture. Should the emulsions be intended for prompt consumption or incorporation in other food products, such as bakery goods, etc., the addition of an edible emulsifying agent may be dispensed with. The presence of such an emulsifying agent is, however, usually desirable, particularly whenever shipment, freezing or storage of the emulsion is intended. Naturally, only such emulsifying agents are employed as are non-toxic and free from any disagreeable taste, odor or color. These are embraced by the term "edible emulsifying agents" employed herein.

A preferred embodiment of my invention has to do with the preparation of a frozen confection similar to ice cream employing my novel emulsions. In this case the emulsions are prepared, while incorporating the desired amount of emulsifying agent, sweetening and flavoring, and are then frozen, preferably in a stirred-type of freezer. The resultant product has a smooth texture and rich taste that is very similar to the usual ice creams. Egg yolk is known to increase the whipping ability of ice cream mixes. Its effect is probably due to the phosphatide-protein content. In order to enhance the whipping qualities of the nut emulsions designed for the preparation of frozen confections, I frequently add about 0.5% of dried whole egg or yolk, or about 2.0% of fresh egg.

It is also possible to prepare a mix of extremely finely ground nuts, emulsifying agent, sweetening and flavoring materials, to which water may later be added, whenever it is desired to form the emulsions. There is no need for special processing or refrigeration of such a mix before the addition of the water. Consequently, such prepared mixtures containing all of the necessary ingredients except water, may be made up in bulk, packaged, shipped and stored, and used only as required.

Another important use of my new products is to produce custard-like confections that may be employed in pies and other bakery products.

The following specific examples will serve to illustrate how my invention may be put into practice.

Example 1

Shelled, cooked peanuts were first treated to remove the hearts and skins. They were comminuted in an ordinary household food chopper and then ground in a Premier colloid mill with clearances set at 0.004–0.005 inch to give a very smooth, syrupy product in which approximately 99% of the solid particles passed through a standard 200-mesh screen and 97% were less than 10 microns in diameter. Such a product and its preparation are more particularly described in the copending application by Wilbur A. Lazier and Joseph F. Vincent.

200 grams of this free-flowing peanut product were mixed with 400 grams of water containing 0.2% by weight of an edible emulsifying agent, such as sodium alginate; the mixture was heated to 165–180° F. for about 10 minutes and then passed through a homogenizer to give a cream-colored liquid having the consistency of a heavy cream. The nut emulsion so produced is very stable and suitable for packing in the usual types of sealed containers in which it may be shipped and stored. Of course, after the addition of water, a good medium for bacterial action exists, and the product must be handled as is any other perishable food. The fat content of the emulsion is about 16.6%, its protein content about 10%, and its carbohydrate content about 3%, based on the usual analysis of dry peanuts.

Example 2

200 grams of the colloidal nut product employed as initial material in the foregoing example and described in the said copending application, were mixed with 24 grams of cocoa, 3 drops of butter flavor, and 0.2 gram of salt. To this mixture there were gradually added 1700 grams of water, with agitation to prevent lumping. The whole was heated to 165° F. in a steam-jacketed container, and 4.2 grams of a food-grade alginate, mixed with 112 grams of sugar, were added. Heating was continued for about 15 minutes, and the product was then homogenized. Thus, there is produced a delicious chocolate-nut flavored drink of high nutritive value, containing about 5% of fat and 3% of protein, as well as carbohydrates, vitamins and minerals.

Example 3

To 200 grams of the same initial material employed in the preceding examples there were added 430 grams of water containing 2 grams of an edible emulsifying agent, such as sodium alginate. The water was added slowly with stirring to prevent the formation of lumps. 140 grams of sugar were then stirred into the mixture. After heating to 165-180° F. for 10 minutes, the whole was passed through a homogenizer. 15 c.c. of maple flavoring were added, and the mixture was then frozen in a stirred-type of freezer. The resultant product possesses a smooth texture and a rich taste hardly distinguishable from the usual maple-flavored ice cream.

Similar frozen confections may be produced using other flavoring extracts, such as caramel, cocoa, and black walnut flavoring, and other edible emulsifying agents, such as gelatin, vegetable gums and the like.

It is sometimes desirable, instead of adding the water, sugar and flavoring separately, first to form a suitably flavored syrup and to add this to the free-flowing, extremely finely ground nut product prior to emulsification.

Freezing may also be accomplished in a stationary freezer, such as the ice tray of a household refrigerator.

Example 4

It is desirable in some cases to use less of the free-flowing nut product in the preparation of the frozen confection, than was used in Example 3. In the event that this is done, it is advisable to add to the mixture, before homogenization, some additional fat or oil, to give a product containing about 12% of fat.

75 grams of the free-flowing nut product were mixed with 8.0 grams of cocoa, 22.5 grams of commercial salad or cooking vegetable oil, 70.0 grams of sugar, 0.1 gram of salt, 1.1 grams of an alginate emulsifying agent, 2.0% of egg yolk, and 1 drop of butter flavor. To this mixture were added 325 grams of water, and the resultant mixture was stirred and heated to 165-180° F. for about 15 minutes in a steam-jacketed vessel. The mixture was homogenized while hot and was then cooled and frozen in a stirred type of freezer. The consistency of the product is less starchy than that of the product of Example 3, and it has a good flavor. Such a mixture contains about 14% of added sucrose, and an appreciable quantity of other carbohydrate material, as well as certain vitamins and minerals naturally present in peanuts.

In each of Examples 1 to 4 an improvement in the stability of the nut emulsion can be attained by the addition of sufficient alkalinizing agent to raise the pH value to between 6.5 and 7.

Example 5

150 grams of the extremely finely ground peanut product were mixed with 45 grams of refined peanut oil. 20.0 grams of egg yolk were dispersed in 600 grams of water, which were then added to the peanut-oil mixture. A smooth consistency was obtained by careful mixing, and the liquid was heated to 165° F. in a steam-jacketed kettle. 2.5 grams of sodium alginate and 1.8 grams of disodium phosphate were added. Heating was continued at 165-180° F. for about 10 minutes. The mixture was homogenized while hot. 150 grams of sugar, ⅛ teaspoon of salt, and two drops of synthetic butter flavor were added. After suitable flavoring with caramel syrup, the flavored emulsion was frozen.

Example 6

150 grams of the extremely finely ground peanut product used in the foregoing examples were mixed with 45 grams of refined peanut oil. 150 grams of sugar, ⅛ teaspoon of salt, 1.8 grams of disodium phosphate, 2.5 grams of an edible alginate, two drops of butter flavor, and 30 grams of cocoa were added, and the whole thoroughly blended. To this mix there were added 600 grams of water and processing was accomplished by heating to 165° F. for 15 minutes in a steam-jacketed kettle, followed by homogenization. The product was then cooled and frozen to form a confection very similar to ice cream.

As many apparently widely different embodiments of the invention may be made without departing from the spirit and scope hereof, it is to be understood that the invention is not limited to its specific embodiments except as defined in the appended claims.

I claim:

1. An aqueous nut emulsion comprising one part by weight of nut particles suspended in nut oil, said particles being of such size that at least 85% by weight thereof will pass through a standard 325-mesh sieve, while at least 90% will also pass through a standard 200-mesh sieve, and from about one to about ten parts by weight of water.

2. An aqueous nut emulsion as claimed in claim 1, containing a small but effective amount of an edible emulsifying agent and a sufficient amount of an alkalinizing agent to raise the pH value of the aqueous phase to between 6.5 and 7.

3. An aqueous nut emulsion as claimed in claim 1, containing a small but effective amount of an edible emulsifying agent, sweetening and flavoring materials.

4. An aqueous peanut emulsion comprising one part by weight of peanut particles suspended in peanut oil, said particles being of such size that at least 90% by weight thereof will pass through a standard 325-mesh sieve, while less than 5% are retained by a standard 200-mesh sieve, and from about one to about ten parts by weight of water.

5. An aqueous peanut emulsion as claimed in claim 4, containing a sufficient amount of disodium phosphate to raise the pH value of the aqueous phase to between 6.6 and 6.8.

6. An aqueous peanut emulsion as claimed in claim 4, which has been stabilized by the addition of a small but effective amount of an edible alginate.

JACK H. MITCHELL, Jr.

REFERENCES CITED

The following references are of record in the file of this patent:

UNITED STATES PATENTS

| Number | Name | Date |
|---|---|---|
| 1,043,839 | Hunter | Nov. 12, 1912 |
| 1,210,667 | Melhuish | Jan. 2, 1917 |
| 1,541,006 | Thevenot | June 9, 1925 |
| 2,198,219 | Musher | Apr. 23, 1940 |
| 2,217,701 | Musher | Oct. 15, 1940 |
| 2,397,564 | Rosefield et al. | Apr. 2, 1946 |

OTHER REFERENCES

"Structure and Composition of Foods," by Winton, vol. 1, John Wiled and Sons, pages 503 and 505.